United States Patent [19]

Stenstrom

[11] E Re. 30,780

[45] Reissued * Oct. 20, 1981

[54] HEAT TREATMENT OF HEAT-SENSITIVE PRODUCTS

[75] Inventor: Lennart A. Stenstrom, Huddinge, Sweden

[73] Assignee: Alfa-Laval AB, Tumba, Sweden

[ * ] Notice: The portion of the term of this patent subsequent to May 7, 1991, has been disclaimed.

[21] Appl. No.: 929,668

[22] Filed: Jul. 31, 1978

Related U.S. Patent Documents

Reissue of:

[64] Patent No.: 3,814,889
Issued: Jun. 4, 1974
Appl. No.: 176,966
Filed: Sep. 1, 1971

[30] Foreign Application Priority Data

Sep. 8, 1970 [SE] Sweden ..... 12153/70

[51] Int. Cl.[3] ..... H05B 6/78

[52] U.S. Cl. ..... 219/10.55 M; 219/10.55 A; 219/10.55 R; 426/237; 422/21

[58] Field of Search ..... 219/10.55 M, 10.55 A, 219/10.55 R; 422/21, 25, 22, 24; 99/451, 485, 517; 426/234, 235, 236, 237

[56] References Cited

U.S. PATENT DOCUMENTS

| | | | |
|---|---|---|---|
| 2,485,659 | 10/1949 | Robertson | 99/217 |
| 2,510,796 | 6/1950 | Brown | 422/20 X |
| 2,838,640 | 6/1958 | Mann et al. | 219/10.41 |
| 3,092,503 | 6/1963 | Gray | 99/217 |
| 3,335,253 | 8/1967 | Jeppson et al. | 219/10.55 A |
| 3,409,447 | 11/1968 | Jeppson | 99/221 |
| 3,470,942 | 10/1969 | Fukada et al. | 219/10.55 B |
| 3,494,723 | 2/1970 | Gray | 21/54 |
| 3,494,724 | 2/1974 | Gray | 21/54 |
| 3,536,129 | 10/1970 | White | 165/2 |
| 3,556,817 | 1/1971 | Jeppson | 99/451 X |
| 3,619,126 | 11/1971 | Carvallo | 422/25 |
| 3,712,823 | 1/1973 | Ueno | 422/21 X |

FOREIGN PATENT DOCUMENTS

| | | | |
|---|---|---|---|
| 731272 | 2/1943 | Fed. Rep. of Germany | 99/451 |
| 831490 | 2/1952 | Fed. Rep. of Germany | 99/451 |
| 957179 | 1/1957 | Fed. Rep. of Germany | 99/451 |
| 1642031 | 8/1966 | Fed. Rep. of Germany | 99/217 |
| 1571833 | 3/1969 | France | 99/217 |
| 2004819 | 3/1969 | France | 99/217 |
| 6809297 | 7/1969 | Netherlands | 99/217 |
| 610520 | 11/1948 | United Kingdom | 99/451 |
| 954258 | 4/1964 | United Kingdom | 219/10.55 M |
| 1063877 | 3/1967 | United Kingdom | 426/234 |
| 1154752 | 6/1969 | United Kingdom | 99/217 |

*Primary Examiner*—B. A. Reynolds
*Assistant Examiner*—Philip H. Leung
*Attorney, Agent, or Firm*—Davis, Hoxie, Faithfull & Hapgood

[57] ABSTRACT

Separate units of a heat-sensitive product are each pre-treated by heating at least the main part of the unit to a pre-heating temperature of at least 50° C., a cooling medium being brought into direct or indirect contact with the unit so that its surface layer is prevented from acquiring a substantially higher preheating temperature than its inner parts; and each product unit is then heated to substantially sterilizing or pasteurizing temperature by electro-magnetic energy of at least microwave frequency.

11 Claims, 2 Drawing Figures

HEAT TREATMENT OF HEAT-SENSITIVE PRODUCTS

Figure 1:
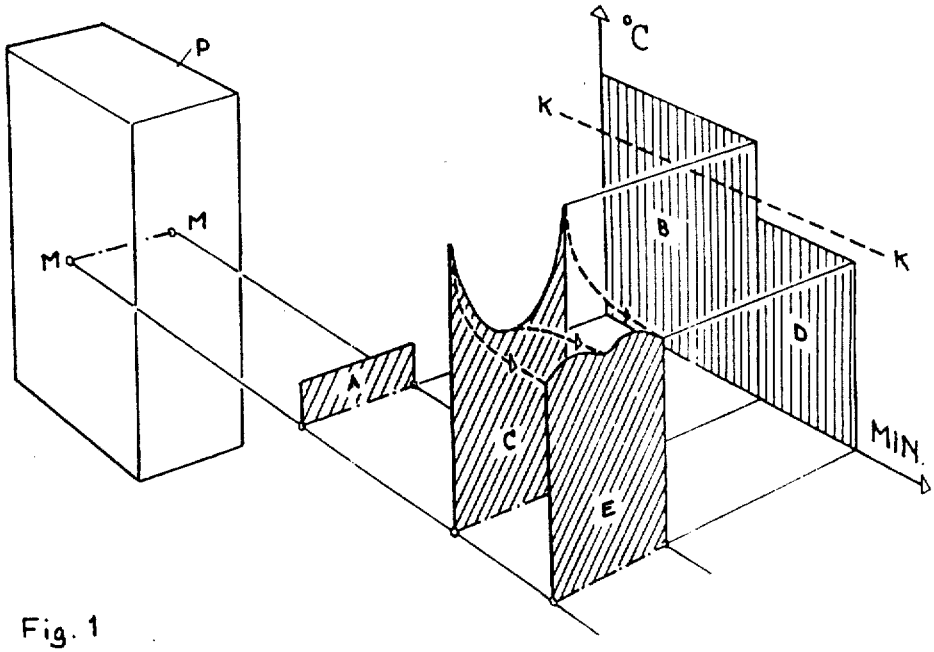

Matter enclosed in heavy brackets [ ] appears in the original patent but forms no part of this reissue specification; matter printed in italics indicates the additions made by reissue.

This invention relates to the treatment of heat-sensitive products by electro-magnetic heating thereof, and more particularly to a novel pre-treatment of the products to prepare them for such heating.

Heat sterilization of a nutritive product means in practice that the product is subjected to a heat treatment such that the spores of the poison-producing bacteria Clostridium botulinum cannot survive. However, a heat treatment of such products in this manner normally leads to an impaired taste of the products, due to complex chemical reactions.

While the sterilization effect of a heat treatment depends substantially upon the temperature during the heat treatment, the chemical effects (many of which are developed to a harmful extent when a critical temperature range typical for the product is obtained) depend to a higher degree than the sterilization effect upon the length of time during which the heat treatment is effected. Therefore, it is desirable in connection with heat sterilization or pasteurization of foodstuffs to use so called HTST-processes, i.e., heat treatment at high temperature for a short time. (HTST is short for High Temperature Short Time).

HTST-processes have long been available for treating fluid and semi-fluid products. For these products, a rapid and effective heat transfer in a conventional manner, together with a subsequent aseptic filling into packages, have been rather easily performed. For solid products, however, HTST-processes have not been carried out satisfactorily so far.

It was understood for many years that electromagnetic energy, due to its special capability of heating the inner parts of a product, should enable a heat treatment of solid food-stuffs substantially in the manner of the HTST-processes as to rapidity and intensity. However, in spite of intensive development work in the field, no satisfactory method has been developed heretofore. Several test runs have been made for heating solid product units to sterilizing or pasteurizing temperature in an electro-magnetic field, and although it was eventually possible to obtain a substantially uniform field strength across a considerable area of a field, it was recognized that product units treated in the field are still unevenly heated. It was found that the edge portions of the product units, as viewed in the main direction of the application of the electro-magnetic field against the product units in a practical frequency range for economic heating, obtained quite a different temperature than other portions of the product units. Further, it has proved that the effect of the electro-magnetic field was damped gradually when penetrating into a product unit, so that product units treated in the field were less heated in their central parts than at their surfaces. This has made a sufficient heat treatment effect in a product unit unachievable, when attempting to sterilize or pasteurize it, unless certain portions of the product unit were so strongly heated that they were spoiled in one respect or another.

In order to solve these problems, it has been attempted to provide means for applying an electro-magnetic field such that an even energy conversion is obtained in product units inserted in the field. So far, this has not given the desired result, however. It has also been attempted to pre-heat product units in a conventional manner prior to heating them in an electro-magnetic field. This has led to an effect contrary to the desired one, however, probably because conventional heating (to an even higher degree than heating in an electro-magnetic field) leads to a greater temperature rise in the edges and surface of the product unit than in the inner parts of it.

The principal object of the present invention is to solve the above-mentioned problems.

According to the invention, each product unit is pretreated by heating at least the main part of it to a preheating temperature of at least 50° C., a cooling medium being brought into direct or indirect contact with the product unit during at least one period, so that the surface layer of the product unit is prevented from acquiring a substantially higher pre-heating temperature than the inner parts of it, and then heating the product unit to substantially sterilizing or pasteurizing temperature by means of electro-magnetic energy of at least microwave frequency.

By a pre-treatment of this kind, an uneven heating of the product unit in the electro-magnwetic field can be tolerated. That is, the temperature range over which the product unit is to be heated in this field has deliberately been reduced, so that the uneven heating in the field will not result in excessive temperature differences within the product unit (for instance, too high a temperature in the edges and surface of the product unit when the inner portions of it have reached the predetermined heat treatment temperature).

In spite of a pre-treatment of the product unit in accordance with the invention, a small temperature difference may occur, of course, in the electro-magnetic field between the outer and inner portions of the product unit. A small temperature difference of this kind may be advantageous, however, because of the fact that it will take a longer time to cool the inner portions of the product unit than the outer portions of it. A uniform sterilizing or pasteurizing effect in the product unit may be achieved by keeping the inner portions of the product unit at a certain temperature during a certain period of time, while keeping the surface of the product unit at a slightly higher temperature during a shorter period of time.

In some cases, as when the product unit is thick or when the electro-magnetic field is damped substantially in the product unit, a very uneven heating of the product unit in the electro-magnetic field can be predicted. In these cases, the advantage of the present invention is especially apparent. The pre-treatment according to the invention is then performed so that outer portions of the product unit will have a lower temperature than inner portions of it, when the final electro-magnetic heating is initiated.

So far, the cheapest way of pre-treating a product unit according to the invention is to bring first a heating medium and then a less heating, surface-cooling medium into direct or indirect contact with the surface of the product unit. The effect of this is that a wall of heat will move inward in the product unit from its surface, even after the point of time when the surface has been brought into contact with the less heating medium and has acquired substantially the temperature of the latter. In certan cases it may be suitable, after having contacted the product unit with the less heating medium, to contact the product unit with another medium that heats its surface during a short time and then, if necessary, with a further medium that cools it again during an even shorter time, etc. In this way, an especially rapid heating of the product unit to a substantially even and high temperature is possible, without the necessity of having the said media at an excessive temperature which is harmful to the product unit.

An even faster but somewhat more expensive way of pre-treating a product unit according to the invention is to pre-heat it by means of electro-magnetic energy, such as microwaves, while keeping down the temperature of the surface of the product unit by means of a cooling medium. The cooling may then be performed before, after or in connection with the pre-heating operation by means of electro-magnetic energy. In the two last-mentioned cases, the cooling medium may be a medium that has been used before the electro-magnetic pre-heating for a certain pre-heating of the product unit in a conventional manner.

In connection with a pre-treatment of the product unit according to the invention by means of electro-magnetic energy, as well as in connection with a pre-treatment by means of heating and cooling media, portions of the product unit preferably are heated to a temperature higher than the pre-heating temperature during a period of time harmless to these portions, after which the product is kept into contact with a medium having a temperature slightly below this pre-heating temperature, until the desired even and high preheating temperature has been obtained in the product unit before the electro-magnetic heating. By the expression "harmless period of time" is meant a period of time which is so short that no substantial quality deterioration of the product unit is caused, especially as to its taste.

The present invention also relates to an apparatus for performing the method described above. This apparatus comprises a number of adjacent vertical chambers communicating with each other at their upper and lower portions so that they form a continuous closed sinuous channel through which the product unit is movable to a zone wherein an electro-magnetic field of at least microwave frequency is applied. Chambers through which the product unit moves downwardly on its way to said electro-magnetic zone are filled with liquid, while the rest of the chambers are filled with gas. The pressure in each gas-filled chamber amounts to the sum of the pressure of the liquid in the chamber with which the gas-filled chamber communicates at its lower end, and the pressure acting on the liquid in this chamber. Finally, the temperatures of the media in the different chambers are such that a product unit moved through the channel to said zone will first pass through at least one chamber containing a heating medium, and then will be brought into contact with a less heating medium, so that the product unit when reaching said zone will have a relatively even and high temperature before the electro-magnetic heating.

In the apparatus according to the invention, the product unit may be heated and cooled by means of either liquid or gas. It is possible to heat the product unit by means of one kind of medium and to cool it by means of the other kind of medium. It is also possible to syringe the product units with liquid of a proper temperature in the gas-filled chambers. In a preferred embodiment of the new apparatus, the arrangement is such that the product unit on its way to said electro-magnetic zone will pass first through a number of hot liquid baths and then through a number of colder liquid baths. The aforementioned zone in this embodiment is situated in a liquid-filled chamber. Preferably, a part of the liquid in this chamber is used for cooling the surface layer of the product unit, before the product unit enters the heating zone.

Figure 2:
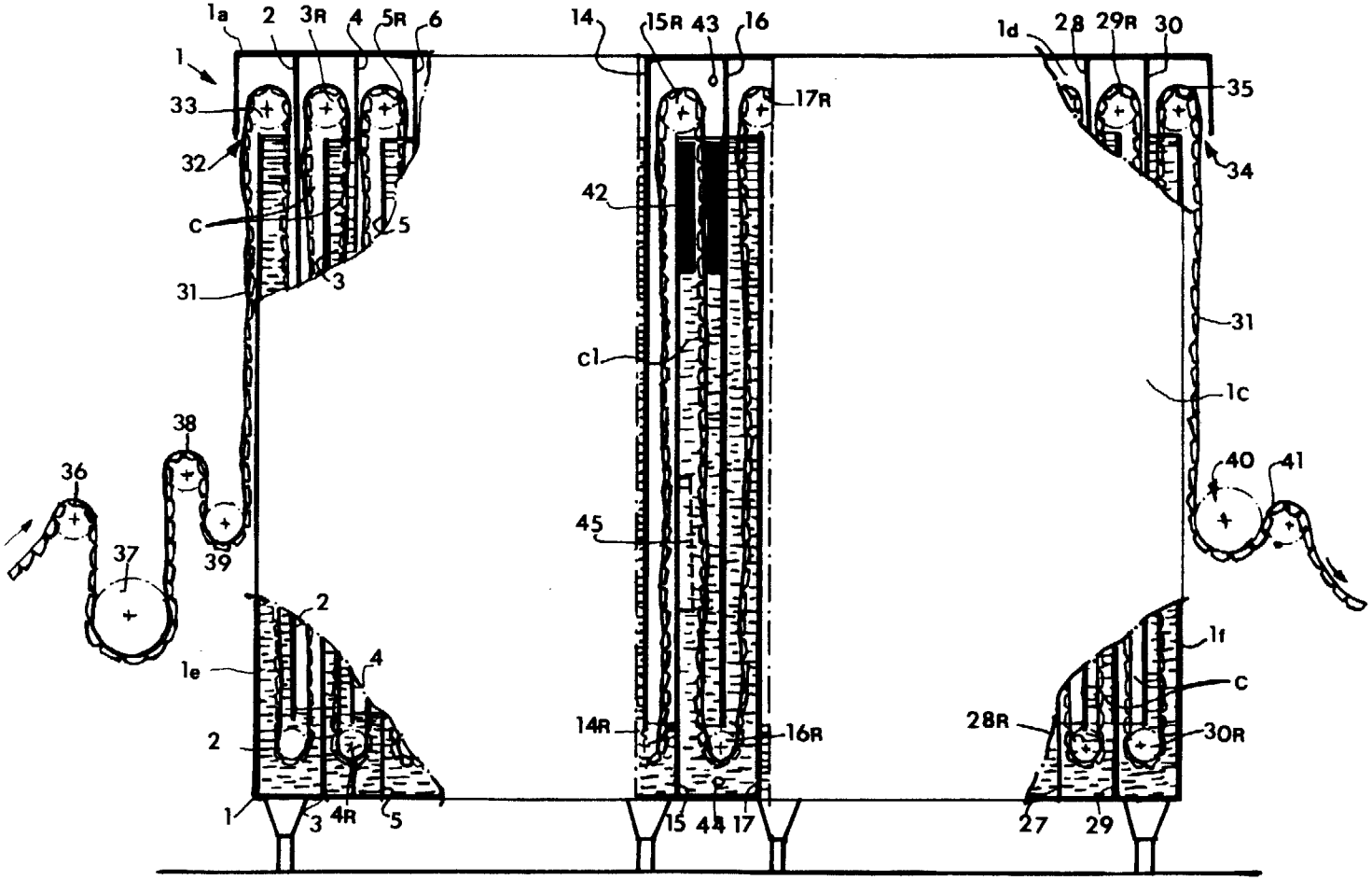

The invention is described more in detail below with reference to the accompanying drawings, in which FIG. 1 is a schematic view showing how a cross-section of a product unit is influenced, as to temperature, during the different steps of a pre-treating operation according to the invention, and FIG. 2 is a side elevational view, with parts broken away, of an apparatus according to the invention for sterilizing or pasteurizing a product unit.

Referring to FIG. 1, the horizontal extension of rectangle A represents the thickness of a product unit P, and the vertical extension of rectangle A represents the temperature of the product unit in a starting condition. As can be seen, the product unit in the chosen example has the same temperature all over its cross-section.

According to one embodiment of the invention, the product unit P is first subjected to a heating medium during a certain time. This is illustrated in FIG. 1 by a rectangle B, the vertical extension of which represents the temperature of the heating medium, and the horizontal extension of which represents the period of time during which the medium is kept in contact with the product unit P. The result of this heating can be seen from a figure C showing that the surface layer of the product unit has acquired a substantially higher temperature than the central part of the product unit.

In this state (C), the product unit is then subjected to a less heating medium, which is "felt" by the product unit as a cooling medium, as its temperature is lower than the temperature of the product unit surface at this moment. This cooling (or in fact continued heating at a lower temperature) is illustrated in FIG. 1 by a rectangle D, and its influence on the product unit P can be seen from a figure E. The product unit has now acquired a high and relatively even temperature.

In FIG. 1 is also shown a dotted line K representing the lower boundary of a temperature range critical to the product in question. For most of the nutritive products, the critical temperature range begins at about 70°-80° C. It is desired, before the subsequent electro-magnetic heating of the product unit to sterilizing or pasteurizing temperature, to have obtained a temperature in the product unit as even as possible immediately below the said critical temperature range. For this reason, the above-mentioned less heating medium is preferably maintained at a temperature of at least 50° C. or more, preferably 60°-70° C.

If the product unit is pre-heated by means of electro-magnetic energy, substantially the temperature distribution illustrated by the figure E in FIG. 1 can be achieved much faster than if the product unit is pre-heated in the above-described way. The product unit may then be surrounded in an electro-magnetic field by a medium which, to a small extent or not at all, absorbs electro-magnetic energy, the medium being maintained at such a lower temperature that the temperature of the surface of the product unit is prevented from rising over a certain value.

It is also possible, however, to cool a surface layer of the product unit before or after the electro-magnetic pre-heating of it. Cooling of the surface layer after the electro-magnetic pre-heating is permissible due to the short time required by electro-magnetic heating.

An apparatus for performing the method according to the present invention is illustrated in FIG. 2. As there shown, the apparatus comprises a housing 1 which contains a large number of vertical, parallel partitions 2 through 30. The even-numbered partitions 2, 4, 6 . . . 30 are fixed to the top 1a of the housing 1 and extend downward to a point slightly above the bottom 1b of the housing, while the odd-numbered partitions 3, 5, 7 . . . 29 are fixed to the bottom 1b of the housing and extend between the other partitions upward to a point slightly below the top 1a of the housing. The partitions 2–30 extend from a front wall 1c of the housing to a rear wall 1d, the housing also having opposite end walls 1e and 1f.

Thus, the housing and its vertical partitions constitute means forming a series of vertically elongated chambers C arranged in a row, with adjacent chambers communicating with each other alternately at their upper and lower portions along the row. Consequently, the chambers C form vertical parts of a continuous and sinuous channel, and this channel is closed except at its inlet end 32 and its outlet end 34.

Either supported by a special conveyor or interconnected only by means of packing material, products to be heat treated in the apparatus are movable through this channel from the left to the right with reference to FIG. 2. One row 31 of interconnected product units extends along the path which the product units are intended to follow through the apparatus. At the free end of each partition within the housing 1, a so-called deflector roll is arranged. The deflector roll opposite to the partition 2 is designated 2R, the deflector roll opposite to the partition 3 is designated 3R, etc. At the inlet 32 of the apparatus, there is arranged a deflector roll 33, and in the outlet 34 of the apparatus is a deflector roll 35. Before entering the apparatus, the products pass a number of deflector rolls 36–39; and after having moved through the apparatus, they pass other deflector rolls 40 and 41. The upper deflector rolls 3R, 5R . . . 29R, 33 and 35 are arranged to be driven synchronously by suitable means (not shown) whereby the product units 31 are transported through the sinuous channel of the apparatus.

The apparatus in FIG. 2 may be divided into three sections, one pretreating section comprising substantially what is to the left of the partition 15, one heating section comprising the chamber between the partitions 15 and 16, and one cooling section comprising substantially what is to the right of the partition 16. Product units to be treated in the apparatus will be pre-heated and heated to the desired treatment temperature in the pre-treating and heating sections and then cooled in the cooling section.

The product units in the heating section (i.e., between the partitions 15 and 16) are surrounded by a pressure which at least substantially corresponds to the vapor pressure arising within the products at the actual heat treatment temperature. For this purpose, the following arrangements are provided.

In the pretreatment section, all of those vertical chambers C through which products move downward within the housing are filled with liquid. The other chambers are filled with gas. In the chamber between the partitions 2 and 3, the gas pressure amounts to a value corresponding to the sum of the atmospheric pressure surrounding the apparatus and the pressure of the liquid column between the end wall 1e of the housing 1 and the partition 2. In the next gas-filled chamber (i.e., between the partitions 4 and 5), the pressure amounts to the sum of the gas pressure in the chamber between the partitions 2 and 3 and the pressure of the liquid between the partitions 3 and 4. In this way the pressure within the gas-filled chambers increases in the direction toward the heating section. Correspondingly, all those chambers C of the cooling section through which the products move upward in the housing 1 are filled with liquid, while the other chambers are filled with gas. According to the same principle as in the pretreatment section, the pressure in the gas-filled chambers of the cooling section increases in the direction from the outlet 34 of the housing toward the centrally situated heating section. Thus, products treated in the apparatus will meet a gradual pressure drop in the cooling section on their way to the outlet 34.

The centrally situated heating section C1, in which the total pressure amounts to about 3.8 bars, may be filled either with gas or with liquid. As shown in FIG. 2, it is filled with water. In the heating section C1, means 42 are arranged for applying an electro-magnetic field, such as microwaves, between the partitions 15 and 16. The product units pass through this field, as shown in FIG. 2. The means 42 for applying this field may be conventional and therefore are shown only schematically.

The desired gas pressures in the different chambers C of the housing 1 can be provided in any suitable manner known to those skilled in the art. An example of an arrangement for this purpose is disclosed in a copending application Ser. No. 176,969, filed Sept. 1, 1971, of Lennart A. Stenstrom and Borje R. Rosenberg entitled "Rapid Heating of Products," such disclosure being incorporated herein by reference.

To perform the method of the invention, the temperatures in the liquid-filled chambers C are kept at predetermined values. For this purpose, inlets and outlets for liquid, valves, thermostat means, etc., may be arranged in any suitable manner, as will be understood by those skilled in the art. An example of such an arrangement is also disclosed in said copending application.

In the following, different temperature programs for the apparatus according to the invention are described, which have been used for sterilizing and pasteurizing products consisting of minced meat packed under vacuum in a thin material that is transparent to microwaves. The outer measurements of the product units were $85 \times 100 \times 20$ mm, and the product units were moved while interconnected only by means of the packing material along the bath 31, the units being moved through the apparatus at a speed of about 6 cm. per second. Along this path, the product units passed under a gradually increasing pressure from the surrounding medium through seven separate liquid baths. In one test run, when the product units were heated to sterility, the Centigrade temperatures in the seven liquid baths were kept at the following values: 90°; 90°; 90°; 80°; 80°; 70°; 70°. Each product unit, when leaving the seventh liquid bath was heated to the following temperatures (°C.) measured at regular intervals along the line M—M in FIG. 1: 69.8°; 69.5°; 69.3°; 69.2°; 69.1°; 69.2°; 69.3°; 69.5°; 69.8°. After having passed through the gas-filled chamber between the partitions 14 and 15, the temperatures in the product units were equalized to the following values (°C.): 69.5°; 69.5°; 69.4°; 69.4°; 69.3°; 69.4°; 69.4°; 69.5°; 69.5°;. (If desired, the temperature of the product unit surface can be prevented from rising over a predetermined value, or even be lowered further, in the gas-filled chamber by syringing the product units with liquid of a proper temperature.)

In this state, the product units entered the electromagnetic field provided by the means 42 in the upper part of the liquid-filled chamber between the partitions 15 and 16. Through an inlet 43, new liquid having a temperature of 65° C. was continuously supplied to this chamber, while simultaneously heated liquid was discharged through an outlet 44 below the inlet in the same chamber. When the product units left the electro-magnetic field, the Centigrade temperatures in them along the line M—M were: 138.0°; 145.1°; 139.0°; 134.1°; 132.3°; 134.1°; 139.0°; 145.1°; 138.0°. The temperature of the liquid situated in the field was gradually increasing in the moving direction of the product units, and was 135° C. where the product units left the field. By means of the liquid in the chamber between the partitions 15 and 16, the obtained temperature in the product units was then maintained until the latter had reached the lower part of this chamber, where the Centigrade temperatures along the line M—M were: 136.3°; 137.6°; 137.5°; 136.5°; 136.0°; 136.5°; 137.5°; 137.6°; 136.3°.

The product units then entered the cooling section of the apparatus, where their temperature was rapidly lowered to about 10° C., the pressure of the surrounding medium being gradually decreasing.

In one test run, where similar products were preheated exactly as during the above-described sterilizing operation and were then heated only to pasteurizing temperature, the following Centigrade temperature distribution was obtained in the product units when they left the electro-magnetic field: 97.4°; 101.6°; 99.3°; 97.2°; 96.4°; 97.2°; 99.3°; 101.6°; 97.4°. When the product units had reached the lower part of the chamber between the partitions 15 and 16, the temperature distribution in the product units was the following (°C.): 96.2°; 97.6°; 98.1°; 98.0°; 97.9°; 98.0°; 98.1°; 97.6°; 96.2°.

FIG. 2 shows in dotted lines further means 45 for applying an electro-magnetic field in the heating section of the apparatus. This arrangement of two means for applying electro-magnetic fields illustrates how product units, by means of an apparatus of this kind, can be both pre-heated and then heated to pasteurizing or sterilizing temperature by means of electro-magnetic energy. In this case, the product units are pre-heated by the means 42 to a temperature slightly below the temperature range critical to the product in question (for instance, 70° C.), after which the temperature rise to pasteurizing or sterilizing temperature is effected by the means 45. The interspace between the means 42 and 45 may be suitable for the equalization of possible temperature differences arising in the product unit in the means 42, before initiating the final heating. Temperature differences of this kind often can be avoided, however, by means of a proper temperature program for the above-described seven liquid baths. Of course, the means for electro-magnetic pre-heating of the product units may be situated anywhere in the pretreatment section of the apparatus, where the pressure surrounding the product units is sufficiently high to correspond to the vapor pressure created within the product units at the temperature to which the product units are to be pre-heated.

During a sterilizing operation performed by means of the arrangement according to FIG. 2 and in which the temperature in all of the seven liquid baths in the pretreatment section of the apparatus was maintained at 20° C., and the means 42 were used for the pre-heating of the product units, the following Centigrade temperature distribution was obtained in the product units before the final heating by the means 45: 70.0°; 74.1°; 74.0°; 71.9°; 70.8°; 71.9°; 74.0°; 74.1°; 70.0°. During the entire operation, water having a temperature of 6° C. was continuously supplied through the inlet 43, hot water being discharged through the outlet 44.

I claim:

1. In the processing of a heat-sensitive product by subjecting it to a sterilizing or pasteurizing treatment temperature, the method which comprises pre-treating units of the product by heating at least the main part of each said unit to a pre-heating temperature of at least 50° C. *interrupting said pretreatment heating*, and subjecting each unit to the influence of a cooling medium to prevent the surface layer of said unit from acquiring a substantially higher pre-heating temperature than the inner parts of said unit, and then heating each product unit to substantially said treatment temperature by subjecting the unit to electromagnetic energy of at least microwave frequency.

2. The method of claim 1, in which said pre-heating temperature is between 60° and 80° C.

3. The method of claim 1, in which said pre-heating is effected by bringing first a heating medium and then a cooling medium into contact with the surface of the product unit.

4. The method of claim 3, in which the temperature of said cooling medium is higher than the temperature of the product unit before said heating medium was brought into contact with the product unit.

5. The method of claim 1, in which said pre-heating of the product unit is effected by an electro-magnetic field.

6. The method of claim 1, wherein portions of the product unit are heated to a temperature above said pre-heating temperature for a period of time harmless to said portions, the product unit then being kept in contact with a medium having a temperature no higher than said pre-heating temperature.

7. The method of claim 1, wherein said pre-treatment gives a surface layer of the product unit a lower temperature than its inner portions when said heating by electro-magnetic energy is initiated.

8. The method of claim 1, wherein the product unit is packaged before said heating thereof to substantially said treatment temperature.

9. The method of claim 1, in which the product unit is surrounded with an aqueous liquid while effecting said heating thereof to substantially said treatment temperature.

10. The method of claim 9, wherein the temperature of said aqueous liquid is controlled to give it substantially said treatment temperature when said electromagnetic heating is completed.

*11. In the processing of a heat sensitive product by subjecting it to a sterilizing or pasteurizing treatment temperature, the method which comprises pretreating units of the product by heating at least the main part of each said unit to a preheating temperature of at least 50° C., interrupting said pretreatment heating, subjecting each preheated unit to a medium having a temperature less than the temperature of the surface of said unit to prevent the surface layer of said unit from acquiring a substantially higher preheating temperature than the inner parts of said unit and then heating each product unit to substantially said treatment temperature by subjecting the unit to electro-magnetic energy of at least microwave frequency, while said unit is surrounded with an aqueous liquid having a temperature less than the surface temperature of the units.*

* * * * *